Patented Aug. 16, 1927.

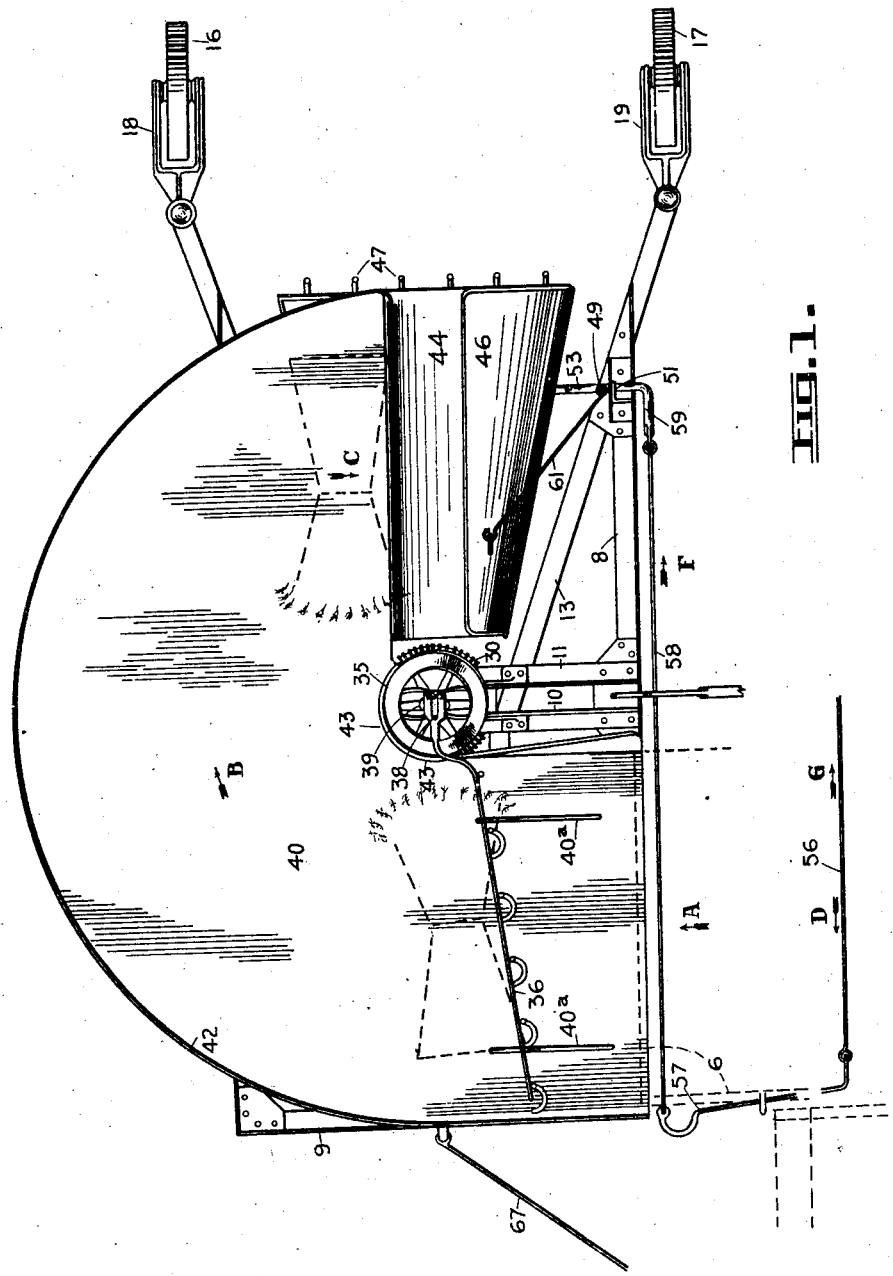

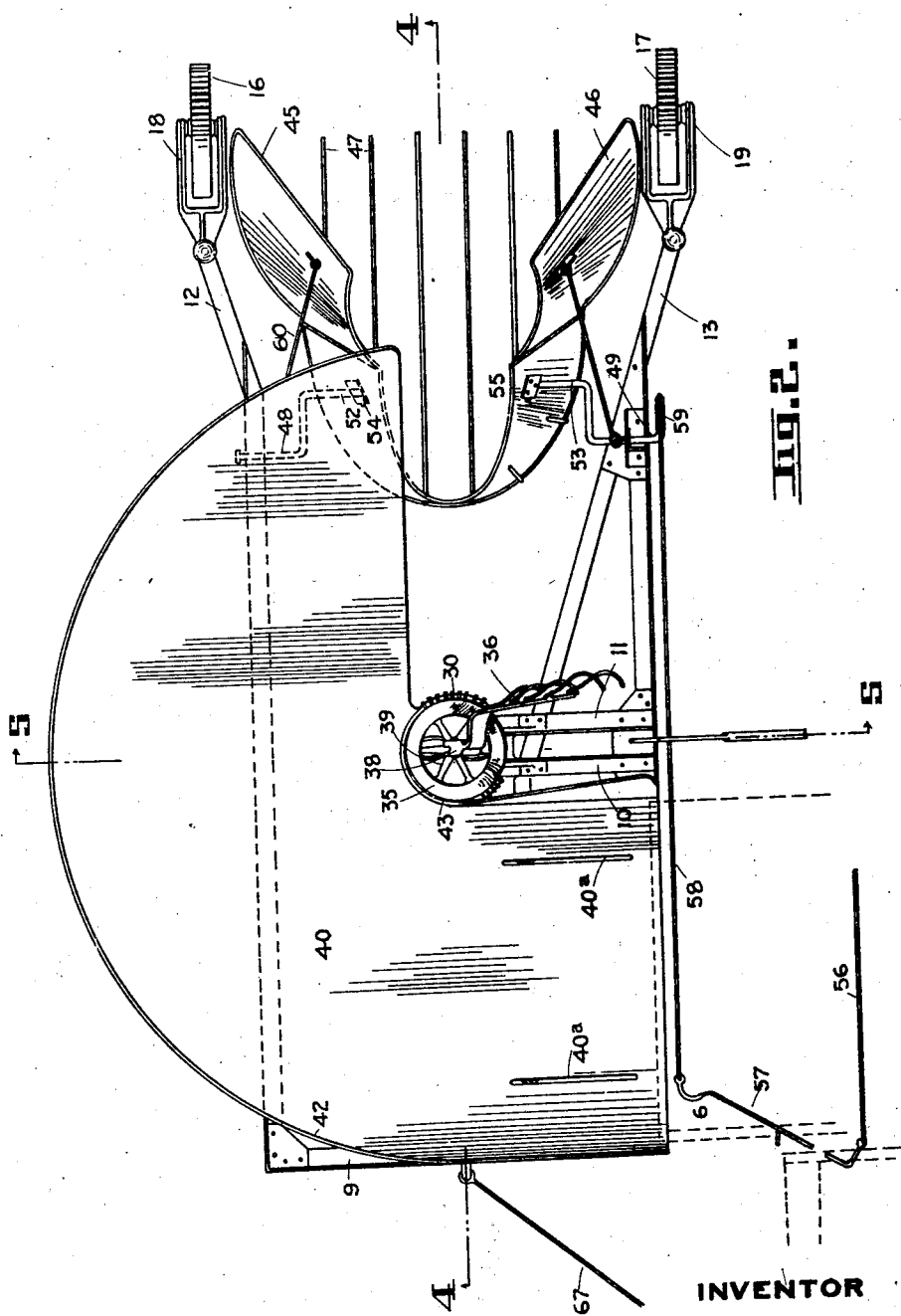

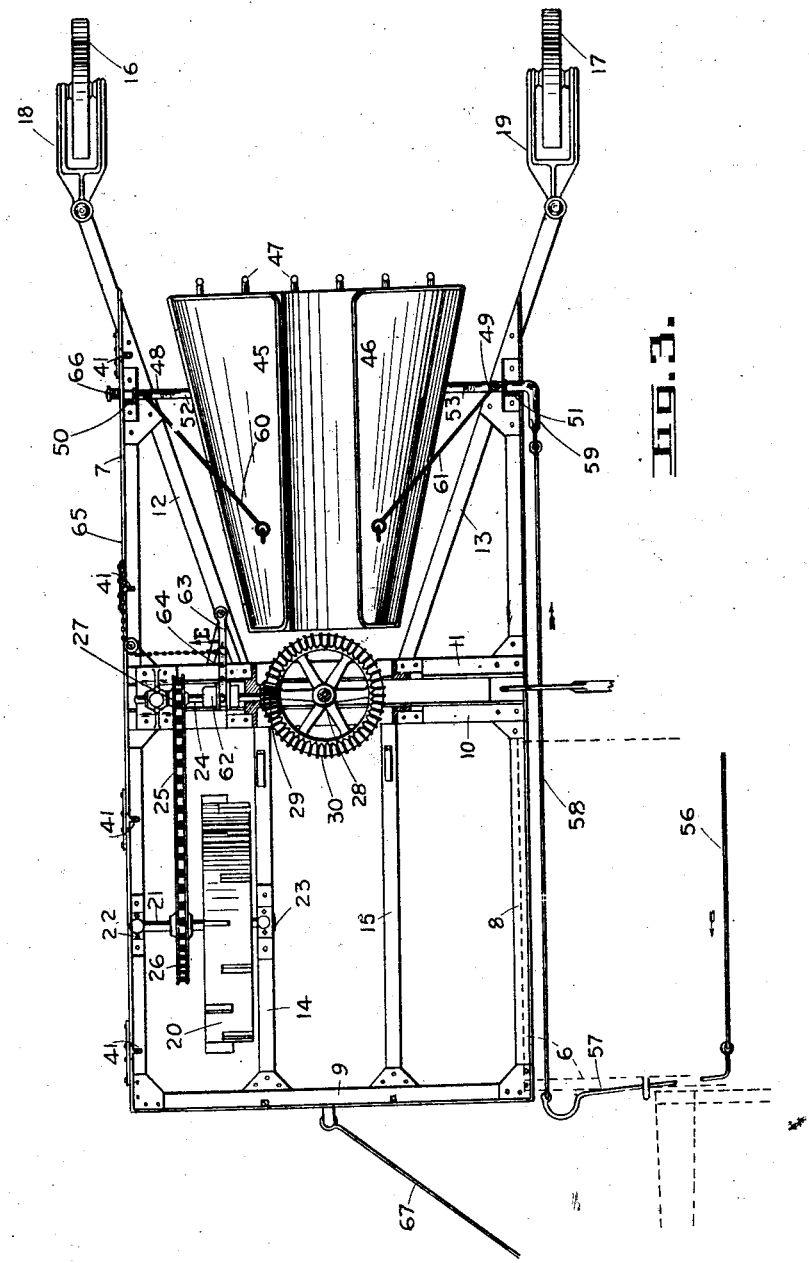

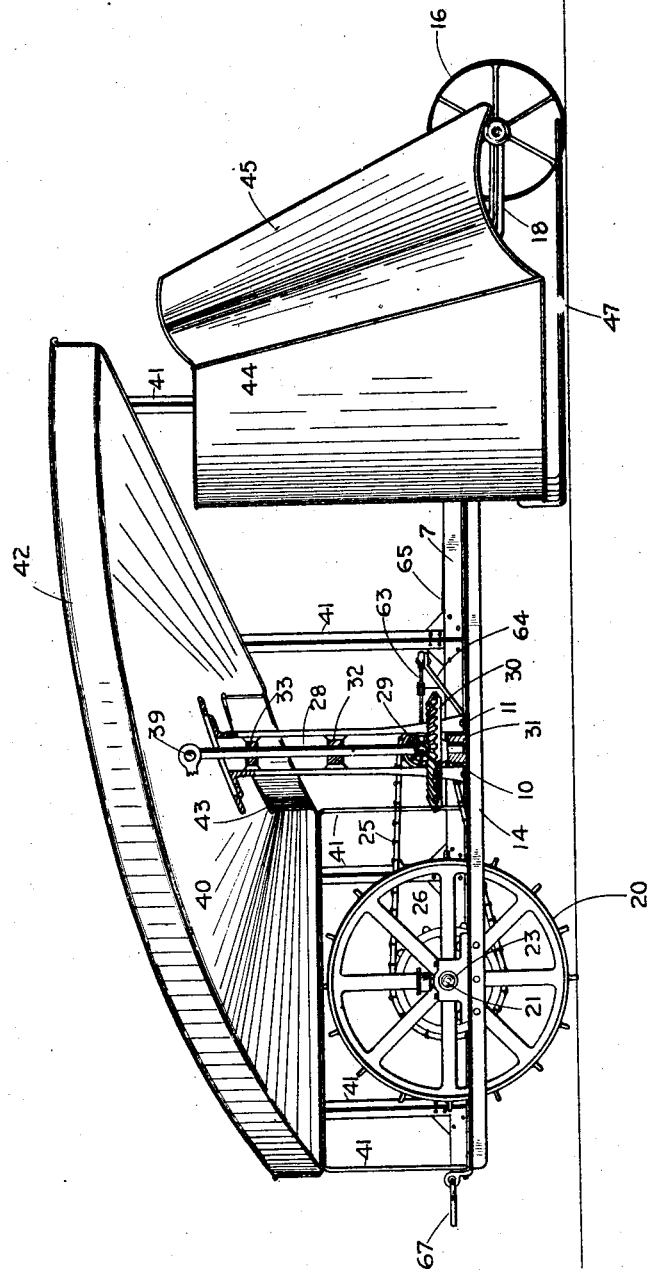

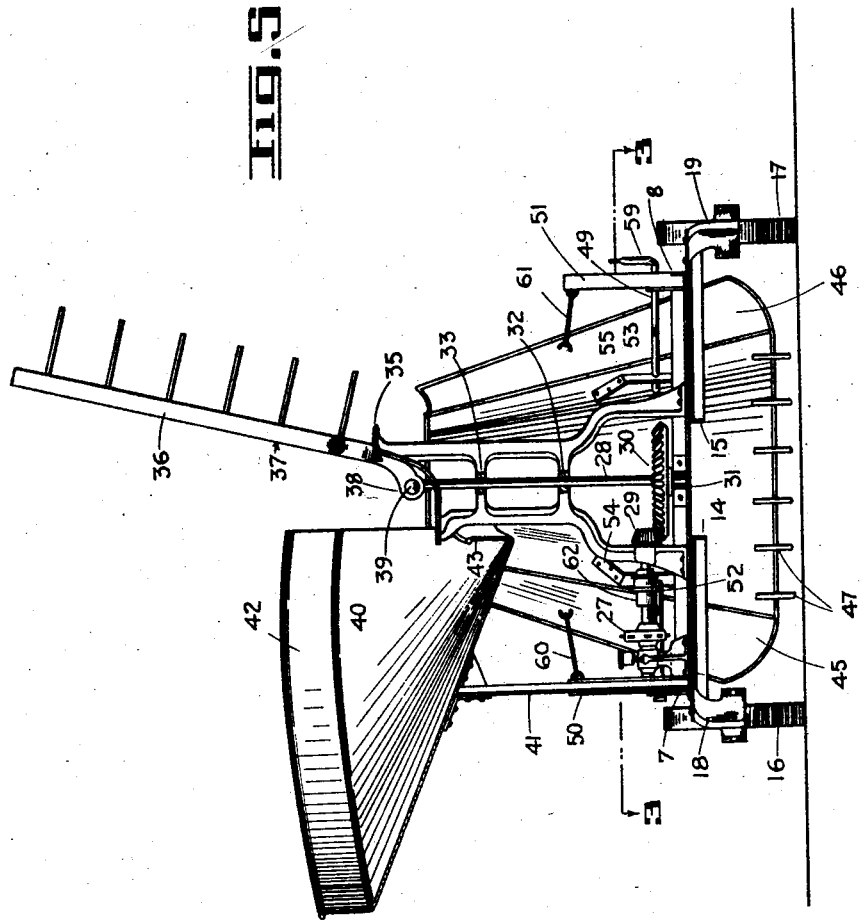

1,639,123

UNITED STATES PATENT OFFICE.

JAMES FARRIS WILLOWS, OF DORENLEE, ALBERTA, CANADA.

STOOKING MACHINE.

Application filed November 11, 1924. Serial No. 749,137.

This invention appertains generally to the art of agricultural implements and has particular reference to stooking machines, its primary object being to provide a machine of this character adapted for operation in conjunction with any of the well known types of grain binders now commercially available, by which the sheaves of grain as they are discharged from the binder may be automatically and intermittently stooked by mechanism controlled by the bundle carrier trip rod of the binder, the necessity of an operator for independently controlling the stooking machine being obliterated, and a considerable saving in labor effected.

Another object of the invention is to provide in a stooking machine of the character described, an inclined elevator onto which sheaves of grain are discharged from the bundle carrier of a binder and upon which said sheaves are propelled upwardly, by a revolving rake travelling in a circuitous path, and turned end-for-end, after which they are discharged into a converter which, when a predetermined quantity of sheaves are discharged thereinto, automatically converts said sheaves to a vertical position and discharges the same in the form of a stook.

A still further object of the invention is to provide in a machine of the character set forth, means for automatically arresting the propelling action of the sheaf feeding rake when the converter of the machine is canted from a horizontal to a vertical position for the purpose of discharging a stook of grain, and for automatically continuing the actuation of said sheaf feeding rake upon completion of the stook discharging operation and return of said converter to the horizontal position in which it is loaded.

A still further object of the invention resides in the provision of a hingedly mounted revolving rake travelling in a circuitous path for feeding the grain sheaves as they are discharged from off the bundle carrier of a binder up an inclined elevator, which rake bears upon an undulated cam track which controls the vertical movement thereof, causing said rake to swoop down upon each revolution thereof and engage a sheaf of grain, and elevate and free itself therefrom when said sheaf of grain is discharged into the converter of the machine.

A still further object of the invention resides in the provision of a converter including a body of substantially semi-frustroconical formation having open ends and being provided with a rack bottom and hinged doors forming a closure means for said body; said converter being mounted upon axles having offset portions which, when said converter is canted from a horizontal to a vertical position for delivery of a stook of grain, said converter is lowered until the stubble of cut grain passes through said rack bottom and engages the stook of grain, effecting the discharge thereof.

Among other aims and objects of the invention may be cited the provision of a stooking machine embodying the foregoing characteristics of construction and operation which is constructed with a view to compactness and durability, wherein the number of parts are few, the construction simple and the cost of production moderate.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application and in which:

Fig. 1 is a plan view of the stooking machine, the relation of the sheaves of grain being shown in position as fed from the binder, and prior to entering the converter to undergo the stooking operation.

Fig. 2 is a similar view showing the converter of the stooking machine vertically arranged as it would appear when discharging a stook of grain.

Fig. 3 is a fragmentary horizontal section taken on the plane designated by the line 3—3 of Fig. 5, portions of the structure being illustrated in elevation.

Fig. 4 is a medial vertical longitudinal sectional elevation.

Figure 5 is a transverse vertical section as it would appear when taken on the plane designated by the line 5—5 of Fig. 2.

Like numerals of reference designate corresponding parts throughout the different views.

As before premised, my invention is adapted for use in conjunction with the conventional binder and may be modified according to the particular construction thereof. For the purpose of this disclosure, I have illustrated in dotted position the relation of the bundle carrier of the binder which is designated by the numeral 6, the same being secured to the stooking machine in any manner suitable to and contingent upon the structure of the particular design thereof.

The frame is preferably formed of angle steel and includes the longitudinal members 7 and 8 which are joined by the transverse members 9, 10 and 11. The wheel supporting members 12 and 13 converge toward the member 11 and extend parallel as at 14 and 15 to the member 9, said parallel portions affording the supporting structure for the main drive wheel 20 and associated mechanism of the machine as hereinafter set forth.

The frame is supported upon the wheels 16 and 17 carried by the swivelled castings 18 and 19 and the drive wheel 20, which is mounted upon the axle 21 journaled in the bearings 22 and 23. The shaft 24 of the machine is driven at the required speed by the chain 25 trained over the sprocket wheel 26 and the sprocket 27, the rotary action of said shaft being transmitted in unison to the shaft 28 by the bevel pinion 29 meshing with and driving the bevel gear 30 mounted upon said shaft 28. The shaft 28 is journaled in the step bearing 31 and the bearings 32 and 33 formed in the casting 34, best shown in Figs. 4 and 5.

The cam track 35 is supported by said casting 34 and is undulated to transmit the proper vertical undulating action to the sheaf feeding rake designated in its entirety by the numeral 36, to effect the required engagement and discharge of the sheaves, as they are fed from the bundle carrier of the binder. The said sheaf feeding rake includes a toothed bar 37 carrying a bifurcated extremity 38 which straddles the upper end of the shaft 28 and is hinged thereto by the pintle 39.

Sheaves are fed from the bundle carrier of the binder onto the sheaf elevator, the same being elevated above the platform 40 thereof by the inclined members 40ª, which action facilitates engagement thereof by the rake 26. The platform 40 is provided with vertical flanged peripheries 42 and 43 which serve to retain the sheaves thereon as they travel therearound in the direction indicated by the arrow B in Fig. 1, until they are turned end-for-end to the position designated by C, shown in the same figure from whence they are discharged from off the sheaf elevator into the sheaf converter.

The sheaf converter includes a semi-frusto-conically shaped body 44 to which the doors 45 and 46 are hinged, which doors, when the converter is horizontally arranged as shown in Figs. 1 and 3, form closure means for retaining sheaves within the converter, in conjunction with the rack bottom 47 thereof. The converter is carried upon the axles 48 and 49 which are pivotally mounted in the standards 50 and 51 carried by the members 7 and 8 of the frame, which axles are provided with offset portions 52 and 53 which extend through the brackets 54 and 55 and are secured to the body 44 of said converter.

When the required number of sheaves are discharged into the converter, the trip rod 56 of the binder moves in the direction of the indicating arrow D, which movement actuates the fulcrum arm 57 and moves the connecting rod 58 in the direction of the indicating arrow F, which connecting rod being connected to the lever 59 integral with the axle 49, will cause the converter to cant over to the position in Fig. 2. The rods 60 and 61 connected to the standards 50 and 51 and to the doors 45 and 46 of the converter, will cause the same to open as shown in Fig. 2, thus permitting a stook of grain to discharge therefrom.

The canting action of the converter arrests the feeding action of the rake 36. Such intermission in the feeding action of the rake is effected by releasing the clutch 62 mounted upon the shaft 24, said clutch being controlled by the lever 63, pivoted to the brackets 64, and the cable 65, which is engaged to the outer end of the axle 48 as at 66, so that as the said axle is rotated the cable is wound thereabout, thus pulling the lever 63 in the direction of the indicating arrow E and thus releasing the clutch 62.

Certain components such as designated by the numerals 67 and 68 may be employed for connecting the stooking machine to the binder. In view of the fact that for each particular type of binder modifications of the same are essential and may be made by those skilled in this particular art, a detailed description of such is deemed unnecessary for the purpose of the present disclosure.

Advancement of the machine with the binder to which it is attached effects rotation of the drive wheel 20, which motion is imparted to the shaft 24 and to the vertical shaft 28, causing the sheaf feeding rake to rotate, the same elevating when passing over the ridge on the undulated cam track 35, as shown in Fig. 5. Upon continuance of its travel said rake will swoop down and grip a sheaf of grain as it passes over the elevating members 40ª mounted upon the platform 40, as shown in Fig. 1, which sheaf is carried up the elevator in the direction of the indicating arrow B and is turned end-for-end, as indicated at C, after which it is discharged from off the elevator and falls into the converter.

When the proper number of sheaves are deposited in the converter, the bundle carrier trip rod 56 moves in the direction indicated by the arrow D, which action, through the mechanism described, causes the converter to cant forward to the vertical position shown in Figs. 2, 4 and 5, the doors 45 and 46 thereof automatically opening so that the sheaves of grain may leave the converter in the form of a stook, the stubble of cut grain engaging the bottom of the sheaves through the rack bottom 47 of the converter, effecting the discharge of the stook.

The canting action of the converter described pulls the cable 65 causing the clutch 62 to release, thus stopping the sheaf feeding rake and arresting the travel of any sheaves of grain which may be upon the elevator.

As the bundle carrier trip rod 56 moves in the direction of the arrow G the converter is canted back to horizontal position, which action closes the doors of said converter through the medium of the rods 60 and 61, and releases the clutch 62, permitting the sheaf feeding rake to continue its circuitous travel about the elevator until the converter is again loaded.

While the preferred embodiment of the invention has been described, it is to be understood that minor changes in the details of construction, combination and arrangement of co-operating elements may be resorted to within the scope of what is claimed without departing from the spirit of the invention.

What I claim as new is:

1. In a stooking machine adapted to be attached to a binder, having an inclined platform on which sheaves of grain are received; a rake for carrying said sheaves over said platform and turning the same to their end-for-end position; a converter into which said sheaves are discharged from said platform and means for intermittently actuating said converter from a substantially horizontal position to a substantially vertical discharge position, portions of said converter being composed of hinged doors and means for swinging said doors open when said converter is in its discharged position.

2. In a stooking machine adapted to be attached to a binder, having an inclined platform on which sheaves of grain are received; a rake for carrying said sheaves over said platform and turning the same to their opposite end-for-end position; an undulated cam track controlling the movement of said rake; and a converter into which said sheaves are discharged from said platform and means for intermittently actuating said converter from a substantially horizontal position to a substantially vertical discharge position, portions of said converter being composed of hinged doors and means for swinging said doors open when said converter is in its discharged position.

3. In a stooking machine adapted to be attached to a binder, having an inclined platform on which sheaves of grain are received; a rake for carrying said sheaves over said platform and turning the same to their opposite end-for-end position; a converter into which said sheaves are discharged from said platform and means for intermittently actuating said converter from a substantially horizontal position to a substantially vertical discharge position, portions of said converter being composed of hinged doors and means for swinging said doors open when said converter is in its discharged position and means for simultaneously lowering said converter as same is actuated to discharge position.

4. In a stooking machine adapted to be attached to a binder, having an inclined platform on which sheaves of grain are received; a rake for carrying said sheaves over said platform and turning the same to their opposite end-for-end position; a converter into which said sheaves are discharged from said platform and means for intermittently actuating said converter from a substantially horizontal position to a substantially vertical discharge position, portions of said converter being composed of hinged doors and means for swinging said doors open when said converter is in its discharged position and means for stopping the movement of said rake while said converter is in discharge position and starting the said movement when said converter returns to horizontal position.

In testimony whereof, I affix my signature.

JAMES FARRIS WILLOWS.